(12) United States Patent  (10) Patent No.: US 8,290,642 B2
Hanson  (45) Date of Patent: Oct. 16, 2012

(54) ELECTRONIC FLIGHT BAG HAVING FILTER SYSTEM AND METHOD

(75) Inventor: Thomas W. Hanson, Englewood, CO (US)

(73) Assignee: The Boeing Company, Chicago, IL (US)

(*) Notice: Subject to any disclaimer, the term of this patent is extended or adjusted under 35 U.S.C. 154(b) by 762 days.

(21) Appl. No.: 11/681,591

(22) Filed: Mar. 2, 2007

(65) Prior Publication Data

US 2008/0215193 A1  Sep. 4, 2008

(51) Int. Cl.
G06G 7/78  (2006.01)
G01C 23/00  (2006.01)
G06F 7/00  (2006.01)
G06F 17/30  (2006.01)

(52) U.S. Cl. .............................................. 701/14; 701/3
(58) Field of Classification Search ............... 244/129.3; 345/592; 455/431; 701/3–18; 717/173
See application file for complete search history.

(56) References Cited

U.S. PATENT DOCUMENTS

| | | | |
|---|---|---|---|
| 5,265,024 A | 11/1993 | Crabill et al. | |
| 5,519,392 A | 5/1996 | Oder et al. | |
| 5,828,332 A | 10/1998 | Frederick | |
| 6,177,945 B1 | 1/2001 | Pleyer | |
| 6,199,015 B1 | 3/2001 | Curtwright et al. | |
| 6,227,491 B1 | 5/2001 | Stephan et al. | |
| 6,384,840 B1 | 5/2002 | Frank et al. | |
| 6,501,392 B2 | 12/2002 | Gremmert | |
| 6,633,801 B1* | 10/2003 | Durlacher et al. | 701/9 |
| 6,694,486 B2 | 2/2004 | Frank et al. | |
| 6,786,453 B2 | 9/2004 | Jones | |
| 6,889,938 B1 | 5/2005 | Nordman | |
| 6,895,331 B2 | 5/2005 | Yoshida | |
| 6,927,782 B2 | 8/2005 | Coldefy et al. | |
| 7,019,757 B2 | 3/2006 | Brown et al. | |
| 7,023,456 B2 | 4/2006 | Huber et al. | |
| 7,028,950 B2 | 4/2006 | Salmon et al. | |

(Continued)

FOREIGN PATENT DOCUMENTS

EP  0926652  6/1999

(Continued)

OTHER PUBLICATIONS

Allen, D. "Electronic Flight Bag." Boeing Aero Magazine, No. 23, Jul. 2003, pp. 16-27.*

(Continued)

*Primary Examiner* — Khoi Tran
*Assistant Examiner* — Dale Moyer
(74) *Attorney, Agent, or Firm* — Harness, Dickey & Pierce, P.L.C.

(57) ABSTRACT

A system and method for filtering information from an electronic flight bag system (EFB) used on a mobile platform, for example, on an aircraft. In one embodiment the system makes use of an EFB having a display with a selection to enable a filter. When the filter is enabled, the user is presented with a plurality of options for limiting retrieved information to only specific types of information or data. This allows one, two or more layers of filtering to be implemented on the information that is searched and obtained from the EFB, and enables a limited subset of information to be obtained that is available for viewing on a display associated with the EFB. The system and method eliminates or significantly reduces the amount of non-relevant information that the crew members are required to review when attempting to obtain specific types of information from the EFB.

18 Claims, 3 Drawing Sheets

U.S. PATENT DOCUMENTS

| | | |
|---|---|---|
| 7,046,254 B2 | 5/2006 | Brown et al. |
| 7,176,937 B2 | 2/2007 | Gannon |
| 7,529,603 B2 * | 5/2009 | Allen et al. .................. 701/3 |
| 2001/0056443 A1 | 12/2001 | Takayama et al. |
| 2002/0149599 A1 | 10/2002 | Dwyer et al. |
| 2002/0171682 A1 | 11/2002 | Frank et al. |
| 2003/0023375 A1 | 1/2003 | Yoshida |
| 2003/0156046 A1 | 8/2003 | Dwyer et al. |
| 2003/0179215 A1 | 9/2003 | Coldefy et al. |
| 2004/0233216 A1 | 11/2004 | Rekimoto et al. |
| 2005/0203676 A1 * | 9/2005 | Sandell et al. ............... 701/3 |
| 2006/0041340 A1 * | 2/2006 | Stefani ......................... 701/4 |
| 2006/0265126 A1 | 11/2006 | Olcott |
| 2008/0018659 A1 | 1/2008 | Aspen |
| 2008/0022217 A1 | 1/2008 | Aspen |
| 2008/0125960 A1 | 5/2008 | Wipplinger |
| 2008/0125962 A1 | 5/2008 | Wipplinger |
| 2008/0269964 A1 | 10/2008 | Majka |

FOREIGN PATENT DOCUMENTS

| | | |
|---|---|---|
| WO | WO 98/10311 | 3/1998 |

OTHER PUBLICATIONS

Garmin International Inc., Garmin 530 Series Pilot's Guide & Reference, 190-00181-00 Rev. C, Apr. 2003, 198 pages.*

* cited by examiner

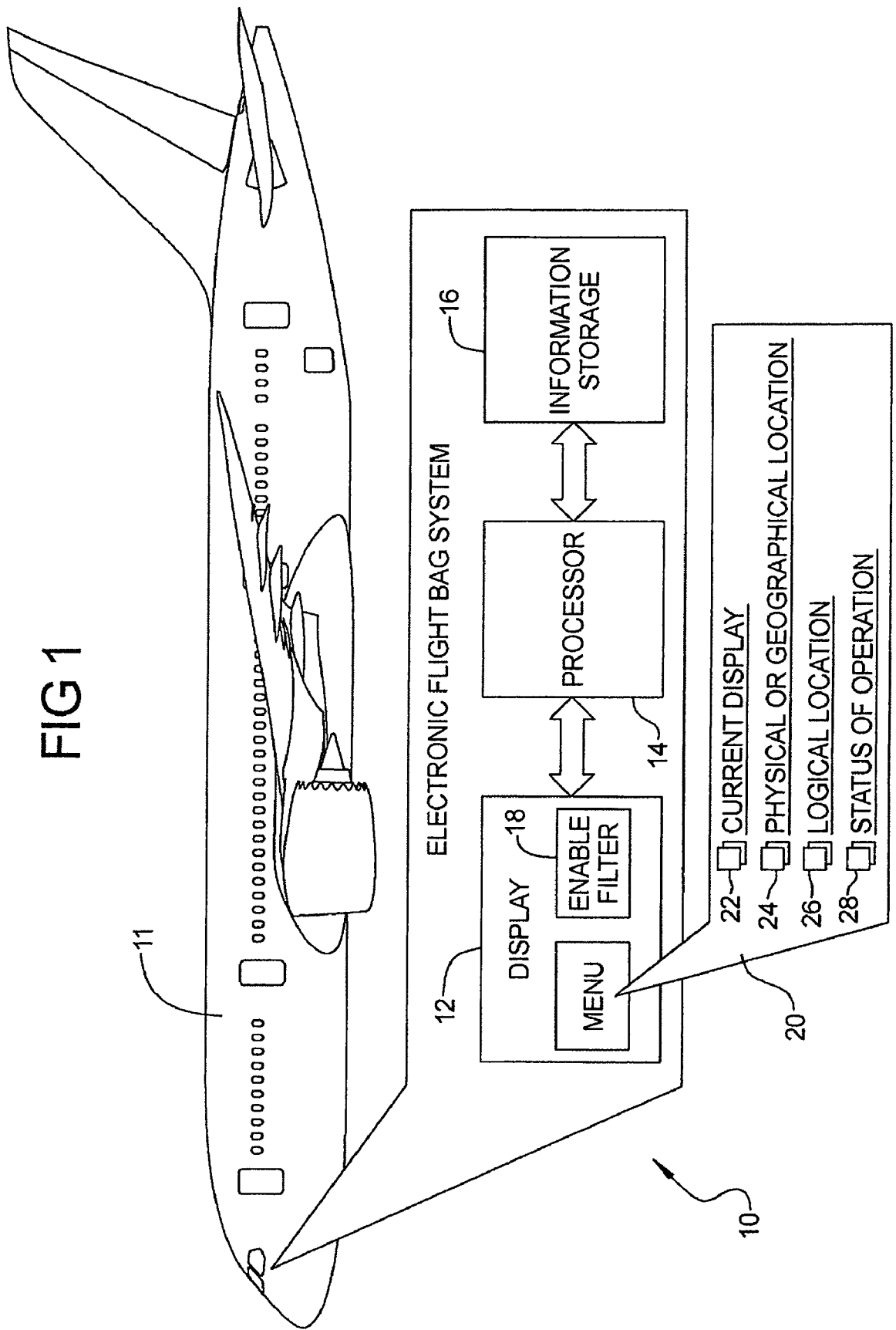

ELECTRONIC FLIGHT BAG HAVING FILTER SYSTEM AND METHOD

FIELD

The present disclosure relates to electronic flight bags used with various forms of mobile platforms, and more particularly, to an electronic flight bag having a system for enabling a user to filter information available from the flight bag to only a desired subset of information based on user defined criteria.

BACKGROUND

The statements in this section merely provide background information related to the present disclosure and may not constitute prior art.

A typical electronic flight bag (EFB) system used with military and commercial aircraft has the capability to store and display a large number of aeronautical charts and other relevant flight-related documents. A conventional EFB is shown for convenience in FIG. 1A. At any time, however, only a small subset of this information available from the EFB is actually, or potentially, relevant to the user. At present, a user who wishes to obtain a certain, limited type of information from the EFB may be required to peruse a considerable amount of non-relevant information before reaching the information or topic of particular interest.

As will be appreciated, the operation of an aircraft by itself can require considerable attention from a crew member. Thus, there exists a significant interest in being able to quickly and easily provide only that information from the EFB that is relevant to a particular request or topic of interest being searched by a crew member who is attempting to retrieve information from the EFB.

SUMMARY

The present disclosure is directed to an electronic information system and method. In one form, the system and method is directed to an electronic flight bag that may be used with commercial and/or military mobile platform, and in one example an aircraft.

In one embodiment, the system comprises a display for displaying information pertinent to operation of a mobile platform, for example, an aircraft. The storage device is used for storing information pertinent to operation of the mobile platform. A selection device is used for enabling a user to select at least two different criterions by which information stored on the storage device can be filtered in order to present the user with a filtered subset of information that is highly pertinent to the route of travel or operation of the mobile platform. The subset of filtered information is made available to the user via the display.

In one implementation the user selection device enables the user to select from at least two of the following criterion for filtering the information available in the storage device: (1) currently displayed information on the display; (2) information pertaining to a real time geographical location of the mobile platform; (3) information pertaining to a logical location of the mobile platform relative to a predetermined route of travel; and (4) a status of an operational aspect of the mobile platform. The filtered subset of information may be made available to the user in a plurality of different ways. For example, in one implementation, the filtered subset of information may be accessed through an icon presented on the display. In another implementation, the information may be accessed by the individual via a hyperlink presented in information (e.g., a text document, chart or graph) being displayed on the display. In another implementation, the filtered subset of information may be presented on the display as a listing of documents that the user may select from. The filtered subset of information represents a limited amount of information that is pertinent to the specific criteria selected by the user.

A method for forming an electronic flight bag system is also disclosed. The method, in one implementation, involves providing an input by which a user may select a first criterion by which stored information pertaining to the mobile platform may be filtered. An operation involving filtering the information in accordance with the first criterion selected by a user may be performed to generate a first subset of information pertinent to the mobile platform. The first subset of information may then be filtered in accordance with a second criterion selected by the user to generate a second subset of information from the first subset of information. The second subset of information will be narrower and more highly focused that the information presented in the first subset. The second subset of information may then be made available to the user via the display.

It will also be appreciated that a refinement of information may be sent to the aircraft via ATC (Air Traffic Controller) messages through one or more of a satellite communication channel, a traditional AM/FM radio communications channel, an ACARS (Aircraft Communication Address and Reporting System) or virtually any other communications scheme. Furthermore, it will be appreciated that on a typical flight plan there are numerous possible terminal procedures. The final landing may require one of many instrument approaches. The ATC may send the final or a preliminary set of terminal procedures to the aircraft rather than talking to the pilot. Thus, it will be appreciated that the EFB may be updated during flight of the aircraft with even further information, thus adding to the voluminous amount of overall information available to the pilot.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a simplified block diagram of a mobile platform, in this example an aircraft, incorporating one embodiment of an electronic flight bag system in accordance with the present disclosure;

DETAILED DESCRIPTION

The following description is merely exemplary in nature and is not intended to limit the present disclosure, application or uses.

Figure 1A:
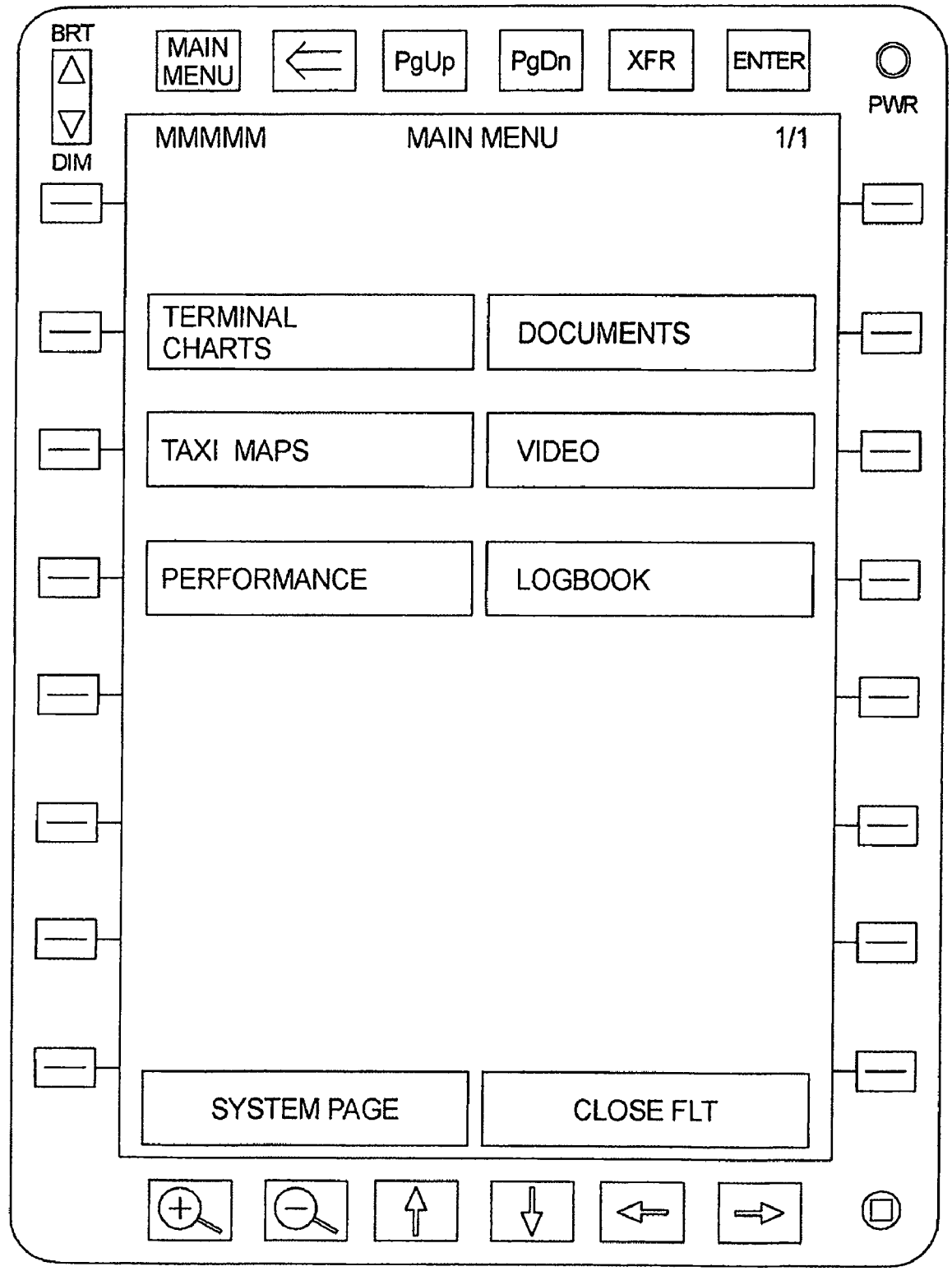
FIG. 1A is a simplified view of the main page of a prior art electronic flight bag.

Referring to FIG. 1, there is shown one embodiment of an electronic flight bag system 10 in accordance with the present disclosure implemented on an aircraft 11. While the aircraft 11 is depicted as a commercial aircraft manufactured by The Boeing Company, it will be appreciated that the system 10 could be implemented on commercial or military aircraft, or even on other types of mobile platforms. For example, the system 10 could just as readily be implemented on marine vessels, rotor craft, or even on land based vehicles such as trains, buses, etc. Thus, it will be appreciated that while the following description makes reference to an electronic "flight" bag system, that the system 10 is not limited to use with only airborne mobile platforms.

The system 10 may include a display 12 that is in bi-directional communication with a processor 14. The processor in turn may be in bi-directional communication with an information storage device 16. Information storage subsystem 16 may comprise a non-volatile storage medium, for example a non-volatile magnetic storage medium such as a magnetic disc drive storage. The information storage subsystem 16 holds wide ranging and voluminous information pertaining, some of which is highly pertinent to the route of travel of the mobile platform, but much of which will not be pertinent. The storage subsystem 16 may store various operational procedures and checklists for the mobile platform, and quite possibly for various other types of aircraft. For example, the information storage subsystem 16 may hold a large number of aeronautical charts that may be used by crew members of the aircraft 11 in navigating the aircraft to a desired destination. Other, non-relevant, charts will also typically be stored and available on the storage subsystem 16. Other possible information might be the locations of airports at various points along the flight path of the aircraft, as well as the locations of airports that are not on the flight path of interest. Similarly, all nearest navaids available may be stored, as well as all airways, all restricted airspace areas, etc. Information particular to the aircraft 11 may also be stored such as various checklists, procedures, etc., that the crew members of the aircraft 11 may be required to follow during different operational phases of the aircraft. As can be appreciated, then, the information storage subsystem 16 typically stores a large volume of complex information, a good portion of which may not be needed for navigating a particular aircraft to a particular destination airport.

With further reference to FIG. 1, the display 12 may take a variety of forms, but in one form may comprise a CRT or LCD touch screen display. If a touch screen display is not used, then the display may include manual controls for selecting specific types of information from the system 10. In one implementation, the display 12 includes an "Enable Filter" selection 18 for enabling a user to select a limited subset of information available from the system 10. When the "Enable Filter" selection 18 is selected a menu 20 may be generated on the display 12. The menu 20 may provide a plurality of different criterion for enabling a user to limit, in a customized manner, the information that is obtained from the information storage subsystem 16 and that is presented or accessible via the display 12. In a commercial aircraft application, it will be appreciated that a carrier (airline) may also limit charts and information to only their selected or preferential airports; however, in an emergency situation the pilot may wish to view all airports that are able to facilitate an emergency procedure. The system 10 readily enables this functionality.

Merely by way of example, the menu 20 may comprise a selection 22 for "Current Display"; a selection 24 for "Physical or Geographic Location"; a selection 26 for "Logical Location" and a selection 28 for "Status of Operation". The "Current Display" selection 22, when checked by the user, selects the information presently being displayed on the display 12 as a first "context" of information. Put differently, when the "Current Display" selection 22 is checked, this forms a first filter layer for limiting information provided by the system 10 to a first subset of the total information from the information storage subsystem 16. When selection 24 relating to the "Physical or Geographic Location" is selected, this limits information provided by the system 10 to that which relates to the physical or geographical location of the aircraft 11 at the present time. For example, such information may comprise the nearest navaid, the nearest airway, nearby restricted airspace areas within a certain radius of the present location of the aircraft 11, etc. When the "Logical Location" selection 26 is selected, this may provide information as to navaids, airways, procedures, etc. which are upcoming within a predetermined distance along the flight path of the aircraft 11 (the "now-next" approach). Such information could also be represented by elements that are relevant to the flight plan. For example, an aircraft might fly close to a particular element, but that element or chart might not be relevant to the flight plan. As a specific example, a wide body commercial jet (e.g., Boeing 747 aircraft) might fly over a small field that has an instrument approach but is far too small for the aircraft to make use of. Thus, even while the particular element is near the flight path, the particular element is still not pertinent to the type of aircraft or its current flight plan.

The "Status of Operation" selection 28 pertains to relevant documents such as checklists, procedures, etc. pertaining to operations to be performed by the crew during different phases of operation of the aircraft 11. The "Status of Operation" selection 28 may also involve emergency procedures that may become relevant if an emergency condition should develop (e.g., one engine goes out).

By selecting two or more of selections 22-28, the user can implement two or more layers of filtering. For example, if the "Physical or Geographic Location" selector 24 is selected along with the "Status of Operation" selection 28, then a limited subset of information pertaining to, for example, airports within a flight range for a current fuel load of the aircraft 11 may be provided. Alternatively, a listing of airports within range of the aircraft 11, taking into consideration reduced performance condition of the aircraft (e.g., one engine is out), may also be presented. As another example, selecting the "Current Display" selection 22 when a current chart is being displayed on the display 12, together with the "Logical Location" selection 26, may allow linking or listing of the next chart(s) in a sequence. For example, such a sequence may involve linking the relevant approach charts relating to a specific arrival chart that is being display on the display 12. As another example, selecting the "Current Display" selection 22 plus the "Logical Location" selection 26, plus the "Status of Operation" selection 28 may allow highlighting of those airports on a currently displayed chart on the display 12 that are suitable for diverting to for an emergency landing.

As will be appreciated, the ability to select from two or more contexts of information to which to limit the information that is made available to a crew member on a display can significantly reduce the amount of information presented to the crew member that needs to be studied and interpreted during operation of the aircraft 11. This can significantly ease the burden of crew members in monitoring and studying important flight related information.

Figure 2:
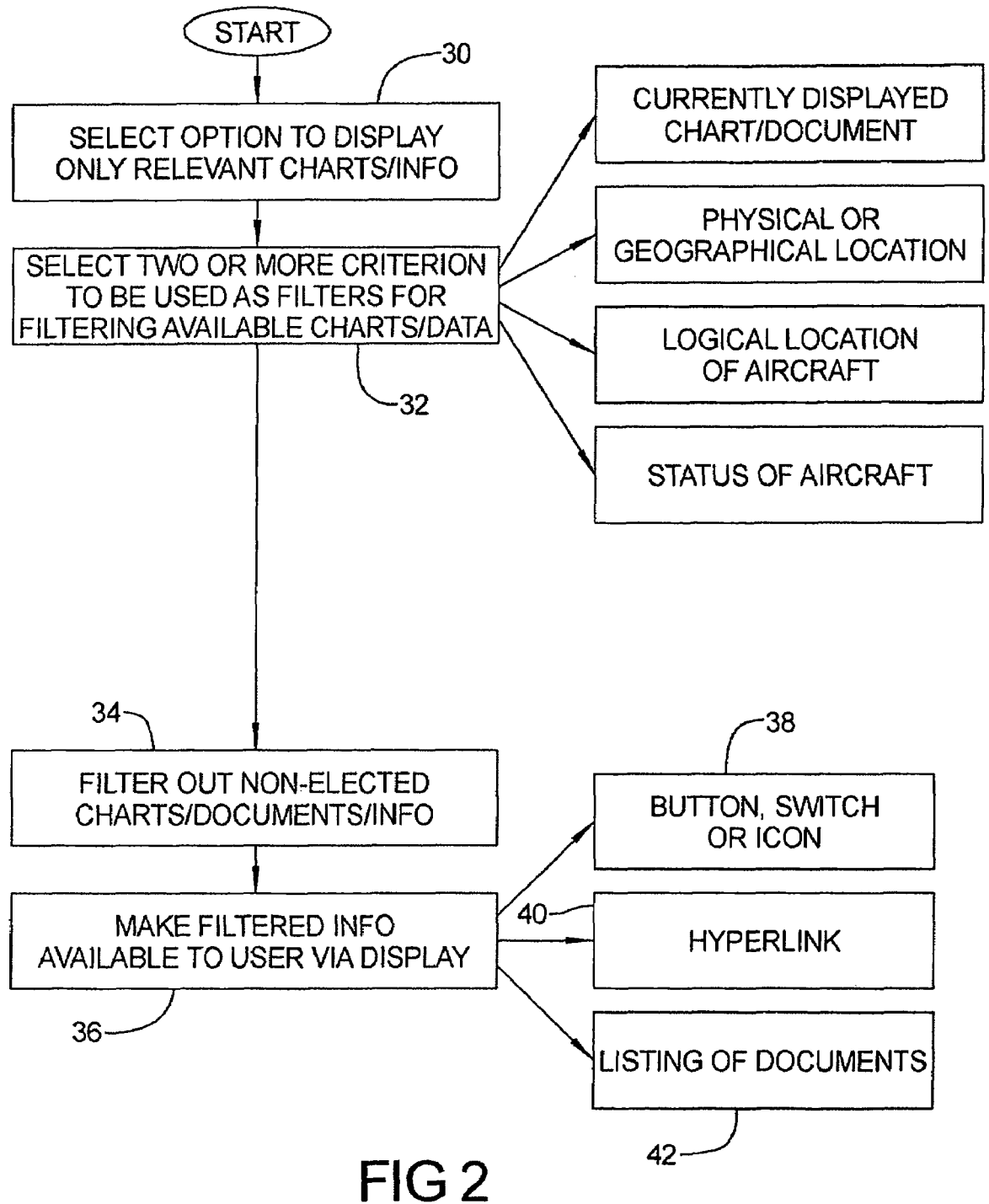
FIG. 2 is a flowchart of operations performed by one implementation of a method of the present system.

Referring to FIG. 2, a flowchart illustrating the exemplary operations performed by the system 10 is illustrated. In operation 30, the user selects the "Enable Filter" selection 18. This places the system 10 in the mode to display only relevant charts or other forms of information that will be selected by the user. In operation 32, the user selects two or more of the sections 22-28 in FIG. 1 to be used as filters for filtering available charts/data or other information available through the system 10. In operation 34, the processor 14 (FIG. 1) filters out the non-elected charts/documents/information to produce a subset of information that is provided to the display 12. In operation 36, the filtered subset of information is presented to the display 12 in one of a plurality of forms. In one form, the information may be accessible to the user via a button, a switch or an icon, as indicated by box 38. In another implementation, the information may be made available through a hyperlink 40 that is presented in a document or chart being displayed on the display 12. In still another implementation the filtered subset of information may be made available as a listing of documents, indicated by block 42, that is presented on the display 12. The user may simply click on a title of any one of the listed document titles to pull up a specific document onto the display 12.

The system and method of the present disclosure thus enables users to filter information available through an electronic flight bag system to a desired, limited subset of information, in accordance with one or more different contexts or criteria. This effectively removes a large amount of non-relevant information that the crew members might otherwise be required to scroll through on the display 12 before obtaining desired data, charts, or information. The system and method of the present disclosure thus can significantly ease the burden on crew members in managing and/or navigating flight of the aircraft 11 to a desired destination.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An electronic flight bag system for use on an aircraft, said system comprising:
 a display for displaying information pertinent to operation of a mobile platform, to a user;
 a storage device for storing information pertinent to operation of said mobile platform; and
 a selection device for enabling said user to select different criteria by which information stored within said storage device is filtered, in order to present said user with filtered subsets of information pertinent to operation of said mobile platform, and in which said subsets of filtered information are made available to said user via said display; and
 a first one of said different criteria including information forming a first subset of information that pertains to a real time geographical location of said mobile platform that is updated during travel of the mobile platform along a predetermined route, such that information pertaining to at least one of the following criteria is updated by a processor of the system as the mobile platform travels along the predetermined route:
  a nearest navaid within a certain radius of the present location of the mobile platform;
  a nearest airway within a certain radius of the present location of the mobile platform; and
  at least one restricted airspace area within a certain radius of the present location of the mobile platform; and
 wherein the at least one of the nearest navaid, the nearest airway and the at least one restricted airspace area is updated without requiring a user request; and
 a second one of said different criteria including information relating to a logical location of mobile platform that forms a second subset of information obtained from said first subset of information, and wherein said second subset of information is generated at least in part based on a specific characteristic of the mobile platform that is being operated.

2. The system of claim 1, wherein said user selection device comprises at least one of a button, switch and icon.

3. The system of claim 1, wherein said display is configured to generate a user selectable hyperlink by which said filtered subset of information is accessed by said user.

4. The system of claim 1, wherein said selection device is configured to enable said filtered subset of information to include a list of documents selectable for viewing on said display by said user.

5. The system of claim 1, wherein said selection device enables said user to select from at least two of the following criteria for filtering said information:
 a currently displayed item of information;
 information pertaining to a logical location of the mobile platform relative to a predetermined route of travel; and
 a status of an operational aspect of the mobile platform.

6. A method for assisting an operator of an aircraft in one of navigating or operating an aircraft, the method comprising:
 providing an input by which a user is able select a first criterion from a plurality of criteria by which stored information pertaining to said aircraft is filtered;
 performing a first filtering operation to filter said stored information in accordance with said first criterion selected by said user, to generate a first subset of information pertinent to said aircraft;
 performing a second filtering operation to filter said first subset of information in accordance with a second criterion selected by said user, to generate a second subset of information from said first subset of information, the second filtering operation including an ability to limit the second subset of information to only information pertaining to a real time physical location of the aircraft and at least one of a reduced performance level and a reduced fuel level; and
 said filtering operations being implemented by providing a user selection device for enabling said user to select different criteria by which information stored within said storage device is filtered, said user selection device including at least one of a button, a switch and an icon;
 making said second subset of information available to said user on a display; and
 wherein performing said second filtering operation includes eliminating portions of said first subset of information such that only those portions of said first subset of information which are pertinent to at least one of the operation or navigation of a specific type of aircraft being operated by the user.

7. The method of claim 6, wherein the operation of providing an input by which a user is able to select a first criterion comprises providing an input by which a user is able to select at least one of:
 a currently displayed item of information; and
 a status of an operational aspect of the aircraft.

8. The method of claim 6, wherein said making said second subset of information available to said user comprises providing a hyperlink in information being displayed on said display to enable said user to retrieve said second subset of information.

9. The method of claim 6, wherein said making said second subset of information available to said user involves presenting a list of documents representing said second subset of information on said display.

10. The method of claim 6, wherein said operation of providing an input by which a user is able to select a first criterion comprises providing an input by which a user is able to select stored information that pertains to flight related information for an aircraft.

11. A method of filtering information in an electronic flight bag system for use on a mobile platform, the method comprising:
providing, using a processor, at least two criteria by which a user of said system is able to filter information available from said system;
providing a selection device by which said user is able to select said two criteria;
making a first subset of the information generated pursuant to said user selection of a first one of said at least two criteria available to said user on a display of said system;
the first subset of the information pertaining to a real time geographical location of said mobile platform that is updated as the mobile platform travels along a predetermined route of travel, with the real time geographical location including at least one of:
a nearest navaid within a certain radius of the present location of the mobile platform;
a nearest airway within a certain radius of the present location of the mobile platform; and
at least one restricted airspace area within a certain radius of the present location of the mobile platform; and
a second one of said at least two different criteria relating to a second subset of the information and being made available on said display, said second subset of the information being limited to only a portion of said first subset of the information that is pertinent to operation of a specific type and operational status of the mobile platform being operated by the user; and
wherein using said selection device further enables said user to select from the following criteria for filtering purposes:
a currently displayed item of the information;
information pertaining to the real time geographical location of the mobile platform relative to the predetermined route of travel; and
a status of an operational status of the mobile platform; wherein the portion of the information pertaining to an operational status of the mobile platform pertains to either a reduced fuel level of the mobile platform or a reduced performance level of the mobile platform.

12. The method of claim 11, wherein said providing at least two criteria by which a user of said system limits the information available from said system further comprises providing at least two of the following criteria:
a currently displayed portion of the information;
a portion of the information pertaining to a logical location of the mobile platform relative to a predetermined route of travel.

13. The method of claim 11, wherein making said first and second subsets of information available to said user on said display system comprises presenting an icon on said display system that said user selects to retrieve the selected said subset of the information.

14. The method of claim 11, wherein making said first and second subsets of information available to said user of said display system comprises presenting a hyperlink on said display, wherein selecting said hyperlink retrieves the selected said subset of the information for presentation on said display.

15. The method of claim 11, wherein making said first and second subsets of the information available to said user involves presenting a list of documents on said display that are selectable by said user.

16. The method of claim 11, further comprising providing a control that enables said user to choose to enable said system to be configured to receive said at least two criteria.

17. An electronic information system for use on a mobile platform, said system comprising:
a display for displaying information pertinent to operation of a mobile platform, to a user;
a storage device for storing information pertinent to operation of said mobile platform; and
a user selection device for enabling said user to select different criteria by which information stored within said storage device is filtered, in order to present said user with filtered subsets of information pertinent to operation of said mobile platform, and in which said subsets of filtered information are made available to said user via said display, said user selection device including at least one of a button, switch and icon;
a first one of said different criteria including information forming a first subset of information that pertains to a real time geographical location of said mobile platform that is updated during travel of the mobile platform along a predetermined route, such that information pertaining to at least one of the following criteria is updated by a processor of the system as the mobile platform travels along the predetermined route:
a nearest navaid within a certain radius of the present location of the mobile platform;
a nearest airway within a certain radius of the present location of the mobile platform; and
at least one restricted airspace area within a certain radius of the present location of the mobile platform;
wherein the at least one of the nearest navaid, the nearest airway and the at least one restricted airspace area is updated without requiring a user request; and
a second one of said different criteria including information relating to a logical location of mobile platform that forms a second subset of information obtained from said first subset of information, and wherein said second subset of information is generated at least in part based on a specific characteristic of the mobile platform that is being operated.

18. An electronic information system for use on a mobile platform, said system comprising:
a display for displaying information pertinent to operation of a mobile platform, to a user;
a storage device for storing information pertinent to operation of said mobile platform; and
a user selection device for enabling said user to select different criteria by which information stored within said storage device is filtered, in order to present said user with filtered subsets of information pertinent to operation of said mobile platform, and in which said subsets of filtered information are made available to said user via said display;
a first one of said different criteria including information forming a first subset of information that pertains to a real time geographical location of said mobile platform that is updated during travel of the mobile platform along a predetermined route, such that information pertaining to at least one of the following criteria is updated by a processor of the system as the mobile platform travels along the predetermined route:

a nearest navaid within a certain radius of the present location of the mobile platform;

a nearest airway within a certain radius of the present location of the mobile platform; and at least one restricted airspace area within a certain radius of the present location of the mobile platform; and wherein the at least one of the nearest navaid, the nearest airway and the at least one restricted airspace area is updated without requiring a user request;

a second one of said different criteria including information relating to a logical location of mobile platform that forms a second subset of information obtained from said first subset of information, and wherein said second subset of information is generated at least in part based on a specific characteristic of the mobile platform that is being operated; and wherein said selection device enables said user to select from at least two of the following criteria for filtering said information:

a currently displayed item of information;

information pertaining to a logical location of the mobile platform relative to a predetermined route of travel; and a status of an operational aspect of the mobile platform.

* * * * *